Patented Aug. 2, 1932

1,870,094

UNITED STATES PATENT OFFICE

JOSEPH C. CARLIN, OF NASHVILLE, TENNESSEE, ASSIGNOR TO TENNESSEE PRODUCTS CORPORATION, OF NASHVILLE, TENNESSEE, A CORPORATION OF TENNESSEE

PROCESS OF TREATING SLAG WOOL

No Drawing.   Application filed October 9, 1930.   Serial No. 487,640.

This invention relates to a process of treating slag wool or mineral wool and has for its object a mode of treatment whereby dusting of said slag or mineral wool is reduced or prevented, thereby eliminating or reducing the danger of injury to the workmen or others while handling the same due to the penetration of the mineral filamentary dust particles.

A further object includes the provision of a slag or mineral wool product having a deliquescent coating and process for making the same.

The slag or mineral wool product thus treated is moreover softened and rendered less brittle by said treatment, so that the treated product may be safely handled with little or no breaking and without dusting.

Although the instant invention is not confined to any particular slag or mineral wool product, it is, however, particularly suited for the treatment of slag wool possessing properties and characteristics which adapt it for use in the manufacture of various commercial products, such as heat insulating, sound deadening, vermin-proofing wall boards, panellings, blocks, coverings, linings and the like, and it contemplates a treatment of the slag wool to obtain a relatively more tenacious and substantially dustless wool product for the uses referred to.

A slag wool possessing properties and characteristics that make it suitable for the above named and other commercial uses is obtained by smelting phosphorus containing material, or phosphatic ore or rock and iron ore, or iron containing material, together with carbon or carbonaceous material and suitable fluxing agents, to thus obtain a molten mass which, in its molten condition, is subjected to a jet or blast of air or steam, whereby such mass is blown into long thin tenaceous and flexible filaments or fibers. The product so obtained has a relatively high phosphorus content and is a type of slag wool suitable for the purpose herein named. After the slag wool is made it is liable to become dusty, even if no dust is present in the finished product. This dusting is due to breakage in handling the wool product, and the dust thus formed is of a fibrous or filamentary character and is practically insoluble and very irritating to both the skin and the mucous membrane, being exceedingly fine and sharp ended and liable to penetrate the hands and other parts of the bodies of those engaged in its production or in the handling of the same.

I have discovered that the dusting of slag wool and mineral wool may be prevented or largely diminished by use of a deliquescent salt applied to the wool material in any appropriate manner as in an aqueous solution, or otherwise, so as to form a deliquescent coating on the wool fiber. This coating has a tendency to produce a hygroscopic condition. The deliquescent agent should preferably be non-volatile and non-flammable, and it should be of such nature as to be readily applied and conveniently handled. If the deliquescent agent is applied in an aqueous solution, it may be sprayed or blown on the wool, or the wool may be immersed in the solution, or the solution may be caused to flow over the wool and thereafter drained to remove excess of the solution. The wool material is then dried and ready for use, or it may be stored for shipping as may be preferred.

As a specific example of treating slag or mineral wool to render it non-dusting or to reduce the dust contained therein, I immerse the wool in an aqueous solution of a deliquescent non-volatile, non-flammable salt, as calcium chloride. Instead of immersing the wool, obviously the solution may be applied in different ways as by flowing the solution over the wool, or by spraying the same thereon. In any case should the wool material be fully covered with the solution, any excess of the solution is then removed by draining, pressing or by evaporation and drying. The slag or mineral wool thus treated retains sufficient calcium chloride, or other deliquescent salt, more or less in the form of a coating of the fibers thereof, to prevent dusting which is due to breaking of the long fine fibrous filaments of the slag or mineral wool.

In practice, I find that excellent results are obtained by treating the wool with a 1½ percent aqueous solution of calcium chloride applied in any convenient manner as in a tank. Thereafter the wool is drained to remove excess of solution. It is then dried by evaporating off the balance of moisture, thus leaving a deposit coating of calcium chloride or other deliquescent salt used. With the presence of a coating of the deliquescent salt on the filaments of the slag wool, there is maintained sufficient moisture to reduce, eliminate or kill any dusting due to the breaking of the wool filaments. Wool thus treated is softer and less harsh to the touch. It is substantially free from dust and easily handled without danger of the filamentary dust penetrating the skin of the workmen handling the same, and causing injury.

Having now described the objects and nature of my invention, what I claim as new and useful and of my own invention and desire to secure by United States Letters Patent is:

1. The process of rendering mineral wool dustless which comprises saturating the wool material with a solution containing a deliquescent salt, then removing excess of solution and drying the wool material.

2. The process of treating mineral wool material which comprises saturating the wool material with an aqueous solution of calcium chloride, then removing excess of solution from the wool material and drying the same.

3. The method of rendering slag wool dustless which comprises submerging the wool material in an aqueous solution of calcium chloride, then draining to remove excess solution from the wool material, and finally evaporating retained moisture to leave a coating of calcium chloride on the wool fibers.

4. The process of treating slag wool which comprises coating the wool fibers with a deliquescent salt solution, and evaporating said solution to form on the wool fiber a coating of the deliquescent salt.

5. The process of rendering slag material non-dusting which comprises saturating wool fibers with a solution containing up to 1½ percent calcium chloride, then freeing said wool from the excess of said solution and evaporating water in the remaining solution to thereby deposit a coating of calcium chloride on said wool fibers.

6. A mineral slag wool comprising a mass of fine fibers coated with a deposit of a non-volatile deliquescent salt.

7. A slag wool comprising a mass of fine fibers coated with calcium chloride.

8. A slag wool comprising a mass of fine fibers or filaments having a phosphorus content and coated with calcium chloride.

9. A mineral slag wool mass as defined in claim 6 characterized in that the mass coating is wholly inorganic.

In testimony whereof I have hereunto set my hand on this 29th day of September A. D., 1930.

JOSEPH C. CARLIN.